US008428197B2

(12) United States Patent  (10) Patent No.: US 8,428,197 B2
Im et al.  (45) Date of Patent: Apr. 23, 2013

(54) ENHANCED CHANNEL ESTIMATION FOR COMMUNICATION SYSTEM RECEIVER

(75) Inventors: Se Bin Im, Gyeonggi-do (KR); Jong Hyeon Park, San Jose, CA (US); Je Woo Kim, San Jose, CA (US); Hyung Jin Choi, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 950 days.

(21) Appl. No.: 11/445,735

(22) Filed: Jun. 1, 2006

(65) Prior Publication Data

US 2007/0280363 A1 Dec. 6, 2007

(51) Int. Cl.
*H04L 27/06* (2006.01)

(52) U.S. Cl.
USPC ........... 375/341; 375/267; 375/347; 375/260; 370/208; 370/210

(58) Field of Classification Search .................. 375/341
See application file for complete search history.

(56) References Cited

U.S. PATENT DOCUMENTS

| 5,394,473 | A  | * | 2/1995  | Davidson ............... 704/200.1 |
| 6,141,393 | A  | * | 10/2000 | Thomas et al. ............ 375/347 |
| 6,795,392 | B1 |   | 9/2004  | Li et al. |
| 7,042,858 | B1 |   | 5/2006  | Ma et al. |
| 7,215,636 | B2 | * | 5/2007  | Seo et al. .................. 370/208 |
| 2002/0118771 | A1 |   | 8/2002 | Larsson |
| 2005/0073949 | A1 | * | 4/2005 | Hayashi ................... 370/208 |
| 2005/0129136 | A1 |   | 6/2005 | Fujii et al. |

FOREIGN PATENT DOCUMENTS

| CN | 1604579 A   | 4/2005 |
| JP | 2005130485 A | 5/2005 |
| JP | 2006020190 A | 1/2006 |
| RU | 2235430     | 8/2004 |

OTHER PUBLICATIONS

International Search Report and Written Opinion of the International Searching Authority Dated Jan. 16, 2008, International Application No. PCT/US2007/12619.
IEEE P802.16REVd/D5-2004, Draft IEEE Standard for Local and Metropolitan area networks, Part 16: Air Interface for Fixed Broadband Wireless Access Systems, pp. i-865, May 2004.
IEEE P802.16/2004/Cor1/D5, Draft IEEE Standard for Local and Metropolitan area networks, "Corrigendum to IEEE Standard for Local and Metropolitan Area Networks—Part 16: Air Interface for Fixed Broadband Wireless Access Systems," pp. I-266, Sep. 12, 2005.
IEEE P802.16e/D12 Oct. 2005, Draft IEEE Standard for Local and Metropolitan area networks, Part 16: Air Interface for Fixed Broadband Wireless Access Systems. Amendment for physical and Medium Access Control Layers for Combined Fixed and Mobile Broadband Wireless Access Systems, Amendment for Physical and Medium Access Control Layers for Combined Fixed and Mobile Operation in licensed Bands pp. i-658, Oct. 14, 2005.
IEEE Std 802.11a-1999, Information technology Telecommunications and information exchange between systems—Local and metropolitan area networks—Specific requirements, Part 11: Wireless LAN Medium Access Control (MAC) and Physical Layer (PHY) specifications, Amendment 1: High-speed Physical Layer in the 5 GHz Band, pp. 1-93, 1999 Edition.

(Continued)

*Primary Examiner* — Lihong Yu
(74) *Attorney, Agent, or Firm* — Tyler J. Overall

(57) ABSTRACT

An embodiment of the present invention is a technique to process signals in a communication system. A channel impulse response (CIR) generator generates a time-domain windowed CIR from a received signal using a window function. A thresholder thresholds the time-domain windowed CIR. A compensator compensates window effect for the thresholded time-domain windowed CIR to provide an enhanced channel estimate in frequency domain.

31 Claims, 9 Drawing Sheets

OTHER PUBLICATIONS

M. Julia Fernandez-Getino Garcia et al, "DFT-based channel estimation in 2D-pilot-symbol-aided OFDM wireless systems," IEEE VTC'01, pp. 810-814, 2001.

Li et al, "Robust Channel Estimation for OFDM Systems with Rapid Dispersive Fading Channels", IEEE Transactions on Communications, vol. 46, No. 7, Jul. 1998, pp. 902-915.

B. Yang et al., "Windowed DFT based pilot-symbol-aided channel estimation for OFDM systems in multipath fading channels", IEEE VTC2000, vol. 2, pp. 1480-1484, May 15-18, 2000.

B. Yang et al., "Analysis of Low-Complexity Windowed DFT-Based MMSE Channel Estimator for OFDM Systems," IEEE Transactions on Communications, vol. 49, No. 11, pp. 1977-1987, Nov. 2001.

Written Opinion—PCT/US2007/012619, International Search Authority—ISA/US—Jan. 16, 2008.

* cited by examiner

ENHANCED CHANNEL ESTIMATION FOR COMMUNICATION SYSTEM RECEIVER

BACKGROUND

1. Field of the Invention

Embodiments of the invention relate to the field of communication, and more specifically, to Orthogonal Frequency Division Multiple Access (OFDMA) or Orthogonal Frequency Division Multiplexing (OFDM) communication systems.

2. Description of Related Art

OFDM/OFDMA systems are becoming popular as a key technology for the next generation of wired and wireless or mobile communications. The Institute of Electrical and Electronics Engineers (IEEE) has provided several standards supporting air interface for fixed and mobile broadband wireless access (BWA) systems using OFDM/OFDMA such as the IEEE 802.16e for mobile BWA systems One of the challenges facing OFDM/OFDMA systems design is estimating the channel responses in the receiver. Existing techniques to provide channel estimation has a number of drawbacks. One technique selects components less than the maximum guard band or the effective maximum length for all components in the time domain. The technique may not be reliable because the selected components may not be effective channel impulse response (CIR) components. In addition, there may be spectral leakage and signal distortions. Another technique uses minimum mean square error (MMSE) to find an optimum solution. This technique is complex, requiring time-consuming computations and may require a priori information such as signal-to-noise ration (SNR) or channel information to find the optimum MMSE solutions.

BRIEF DESCRIPTION OF THE DRAWINGS

Embodiments of invention may best be understood by referring to the following description and accompanying drawings that are used to illustrate embodiments of the invention. In the drawings.

DESCRIPTION

Figure 1:
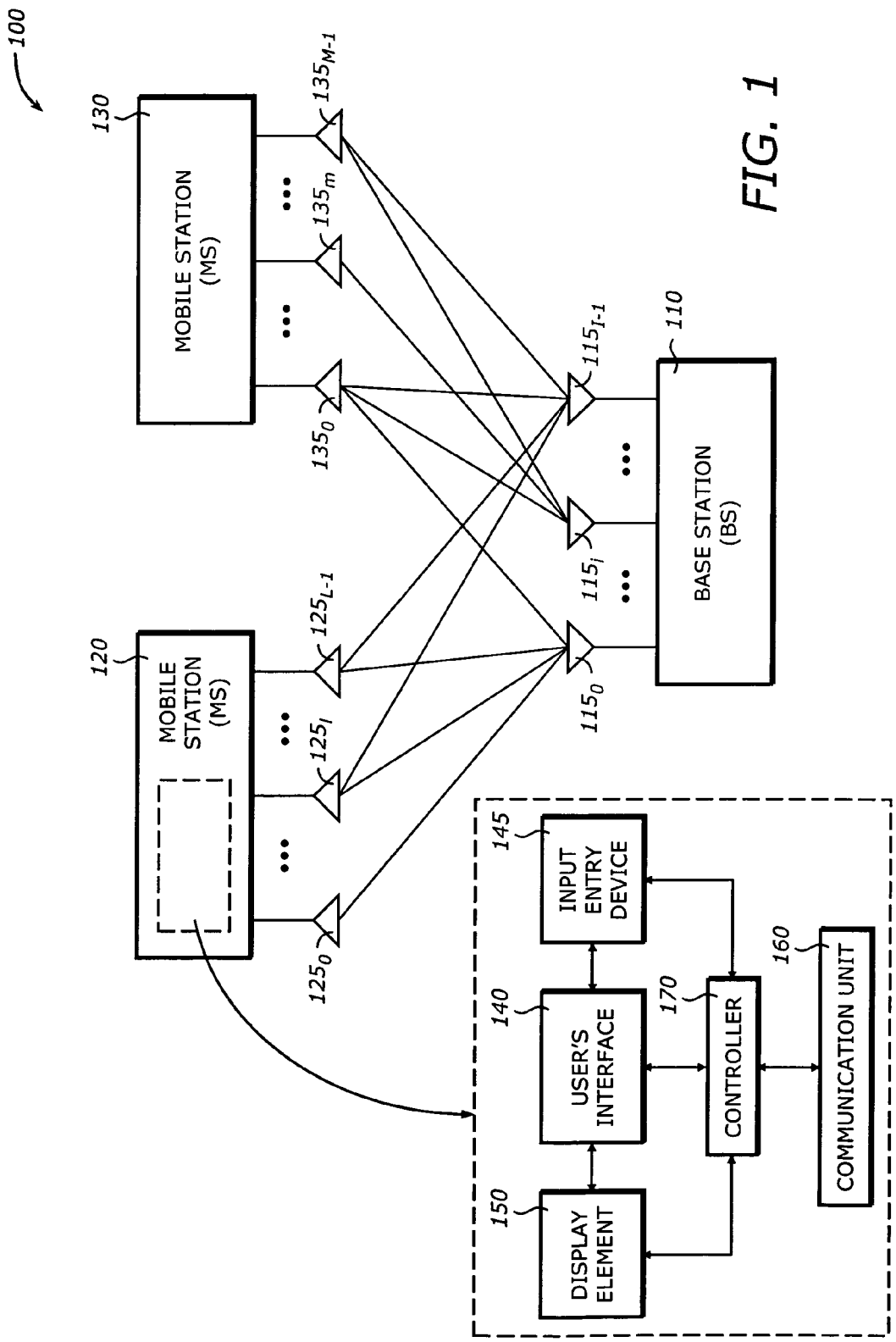
FIG. 1 is a diagram illustrating a system in which one embodiment of the invention can be practiced.

An embodiment of the present invention is a technique to process signals in a communication system. A channel impulse response (CIR) generator generates a time-domain windowed CIR from a received signal using a window function. A thresholder thresholds the time-domain windowed CIR. A compensator compensates window effect for the thresholded time-domain windowed CIR to provide an enhanced channel estimate in frequency domain.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, functionality, or a task, etc. A functionality or an operation may be performed automatically or manually.

An embodiment of the invention is a receiver processing unit for wireless communications based on OFDM/OFDMA techniques. The receiver processing unit includes a signal processing unit to process a received radio frequency (RF) signal, a channel estimator to provide an enhanced channel estimate using the processed received RF signal, and an equalizer to generate an equalized signal using the processed signals and the enhanced channel estimate. The signal processing unit provides a frequency-domain received signal. The channel estimator includes a channel impulse response (CIR) generator to generate a time-domain windowed CIR from the frequency-domain received signal using a window function, a thresholder to threshold the time-domain windowed CIR, and a compensator to compensate window effects for the thresholded time-domain windowed CIR to provide the enhanced channel estimate in frequency domain channel estimator. In one embodiment, the compensator compensates the window effects for each cluster in the thresholded time-domain windowed CIR in the time-domain using a pre-computed inverse matrix. Since the computations are based on a partial dimension, instead of the full dimension of the entire time-domain windowed CIR, and the matrix inversion is done off-line, the compensation is computationally efficient with simple architecture. In addition, the technique uses an adaptive thresholding scheme to remove noise components from the initially estimated channel, resulting in effective performance. Furthermore, the technique does not require a priori information such as SNR or channel information.

FIG. 1 is a diagram illustrating a system 100 in which one embodiment of the invention can be practiced. The system 100 includes a base station (BS) 110 and a number of mobile stations. For illustrative purposes, only two mobile stations 120 and 130 are shown. As is known by one skilled in the art, any number of mobile stations may be used.

The base station 110 has a number of antennae $115_0$ to $115_{I-1}$. The mobile station (MS) 120 has a number of antennae $125_0$ to $125_{L-1}$. The MS 130 has a number of antennae $135_0$ to $135_{M-1}$. I, L, and M are any positive integers. The MS 120 or 130 represents any mobile unit or sub-system such as cellular phones, mobile personal digital assistant (PDA), mobile hand-held devices or computers. In one embodiment, the BS 110 and the MS's 120 and 130 are compatible with a OFDM/OFDMA standard, such as the IEEE 802.16e or IEEE 802.16d.

The MS 120 includes a user's interface 140, an input entry device 145, a display element 150, a communication unit 160, and a controller 170. The user's interface 140 provides interface to the user. It may include graphics user's interface (GUI), menu, icons, etc. The input entry device 145 may include any input entry devices such as keyboard, pointing device (e.g., stylus), mouse, etc. to allow the user to enter data or commands. The display element 150 provides a display. It may be any type of display suitable for mobile devices such as thin-film transistor (TFT) liquid crystal display (LCD), color super-twist nematic (CSTN), double-layer super-twist nematic (DSTN), high-performance addressing (HPA), or any other active or passive-matrix displays. The communication unit 160 receives and transmits data via the antennae $125_0$ to $125_{L-1}$. The communication unit 160 provides an enhanced channel estimate in a receiver processing unit. The controller 170 controls the operation of the MS 120 including processing receive and transmit data, controlling the input entry device 145 and/or the display element 150, and performing other house-keeping tasks. It may include a processor, a digital signal processor, a micro-controller, etc. and associated memory and peripheral devices.

Figure 2:
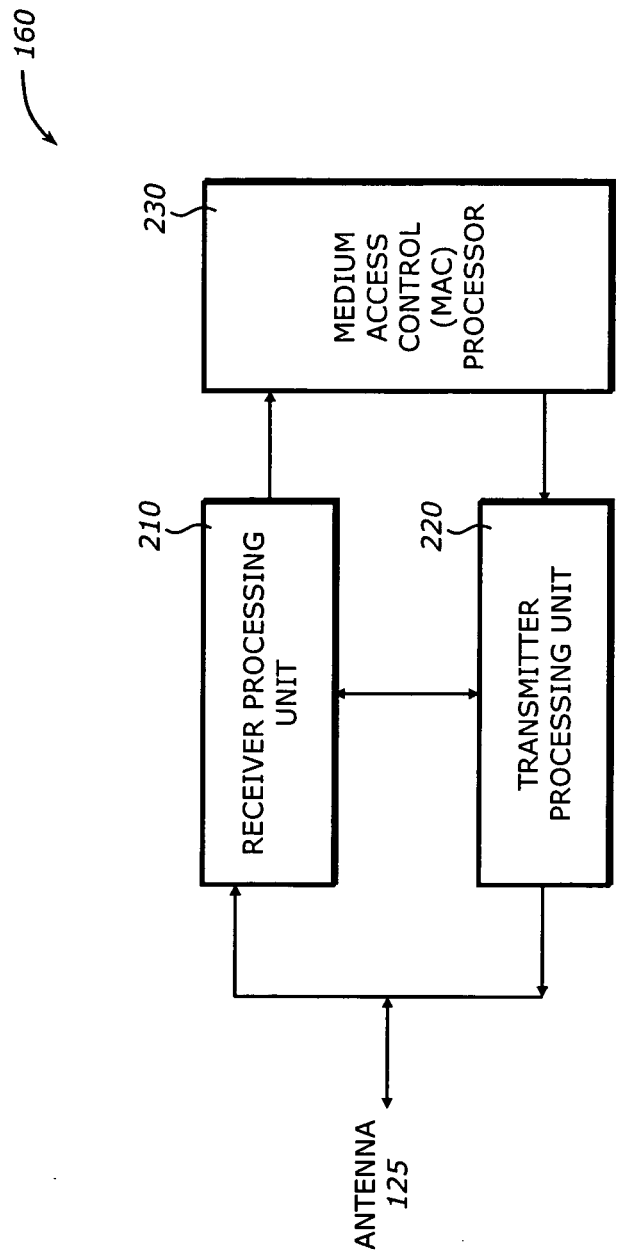
FIG. 2 is a diagram illustrating a communication unit system according to one embodiment of the invention.

FIG. 2 is a diagram illustrating the communication unit 160 shown in FIG. 1 according to one embodiment of the invention. The communication unit 160 includes a receiver processing unit 210, a transmitter processing unit 220, and a medium access control (MAC) processor 230. The designation of the terms "receiver" and "transmitter" is mainly for clarity. An element in the receiver processing unit 210 may belong to the transmitter processing unit 220, and vice versa.

The receiver processing unit 210 processes the RF signals received from the antennae 125 via a downlink (DL) reception path. It provides a decoded signal or a base-band data stream to the MAC processor 230. It may also provide an enhanced channel estimate to the transmitter processing unit 220.

The transmitter processing unit 220 receives the transmit data from the MAC processor 230 to generate the RF transmit signals to the antenna 125 via an uplink (UL) transmission path. The transmitter processing unit 220 may include a mapper, an inverse frequency-domain processor, a guard inserter, and an RF front end processor.

The MAC processor 230 performs data processing on the decoded signal from the receiver processing unit 210 and the transmit data to be sent to the transmitter processing unit 220. In addition, it may also provide other control data for the transmitter processing unit 220.

Figure 3:
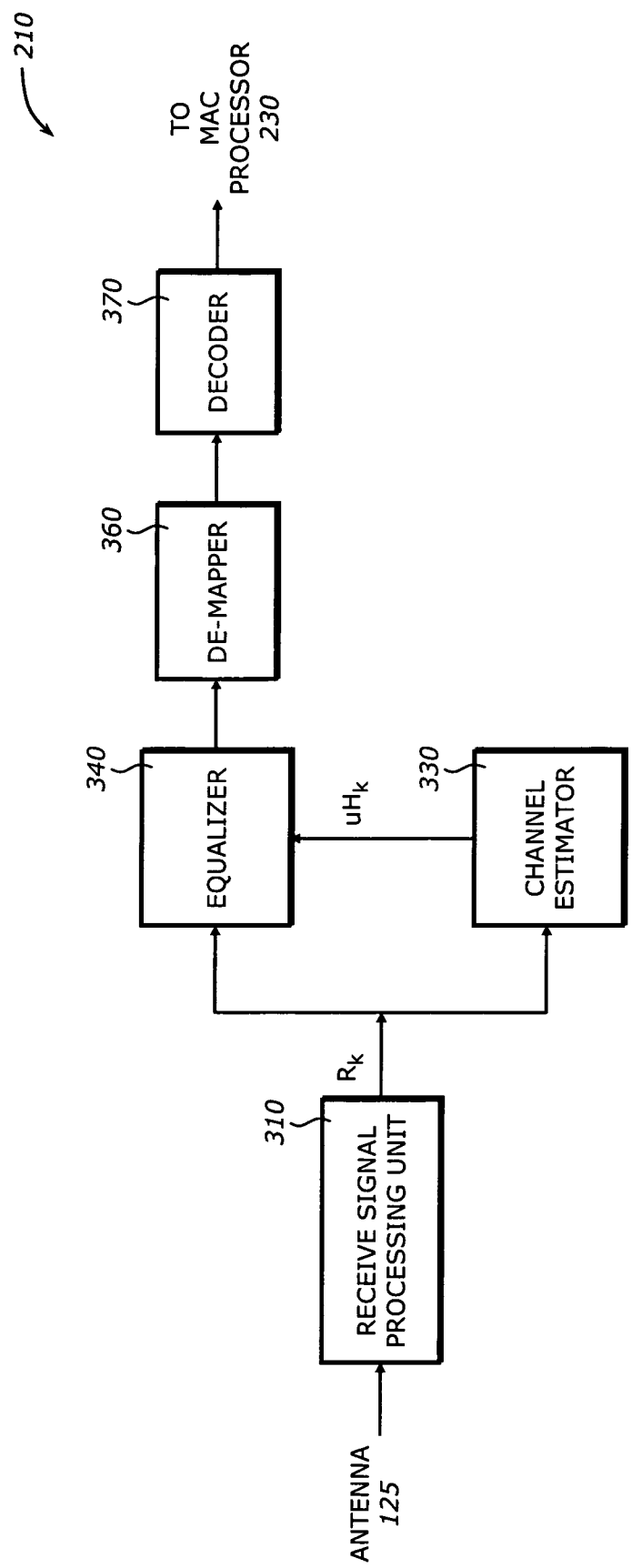
FIG. 3 is a diagram illustrating a receiver processing unit according to one embodiment of the invention.

FIG. 3 is a diagram illustrating the receiver processing unit 210 shown in FIG. 2 according to one embodiment of the invention. The receiver processing unit 210 includes a receive signal processing unit 310, a channel estimator 330, an equalizer 340, a de-mapper 360, and a decoder 370.

The signal processing unit 310 is connected to the antenna 125. It processes the signal received from the antenna 125 and generates a frequency-domain signal $R_k$. The frequency-domain signal $R_k$ may be a sequence of data having a length of N where N is a positive integer.

The channel estimator 330 estimates the channel response using the processed signal from the signal processing unit 310. The channel estimator 330 generates an enhanced channel estimate $uH_k$ to the equalizer 340.

The equalizer 340 generates an equalized signal $E_k$ using the processed signals $R_k$ and the enhanced channel estimate $uH_k$ provided by the channel estimator 330. The equalized signal $E_k$ may be computed according to the following equation:

$$E_k = \begin{cases} \dfrac{R_k}{uH_k}, & \text{if } k \text{ is used subcarrier} \\ 0, & \text{else} \end{cases}, k = 1, \ldots, N \quad (1)$$

where N is the number of data points used in the signal processing unit 310

The de-mapper 360 de-maps the equalized signal $E_k$. The decoder 370 decodes the de-mapped signal. The decoded signal is then processed by the MAC processor 230.

Figure 4:
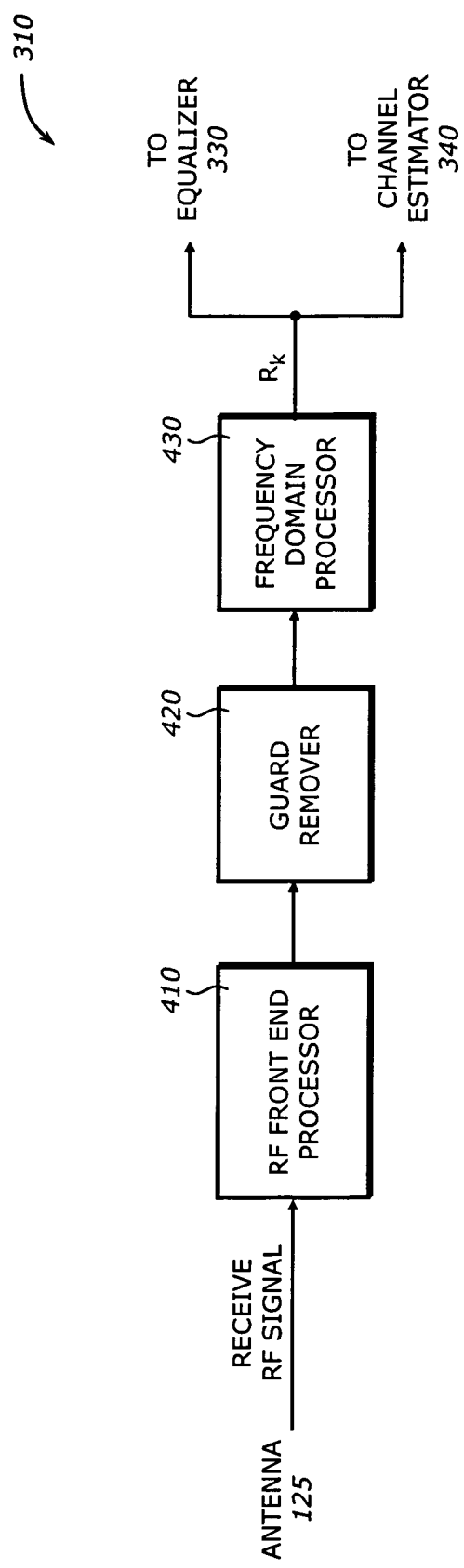
FIG. 4 is a diagram illustrating a signal processing unit according to one embodiment of the invention.

FIG. 4 is a diagram illustrating the receive signal processing unit 310 shown in FIG. 3 according to one embodiment of the invention. The receive signal processing unit 310 includes a RF front end processor 410, a guard remover 420, and a frequency domain processor 430.

The RF front end processor 410 performs RF functions on the corresponding received RF signal. The RF functions may include RF signal conditioning, filtering, down-conversion, and analog-to-digital conversion. The guard remover 420 removes a guard band from the received signal.

The frequency domain processor 430 converts the received signal to the frequency-domain signal $R_k$ having N data points. The frequency domain signal corresponds to the processed signal $R_k$. It is sent to the equalizer 330 and the channel estimator 340. In one embodiment, the frequency domain processor 430 computes the Fast Fourier Transform (FFT) of the corresponding received data stream representing the received signal where the FFT size is N.

Figure 5A:
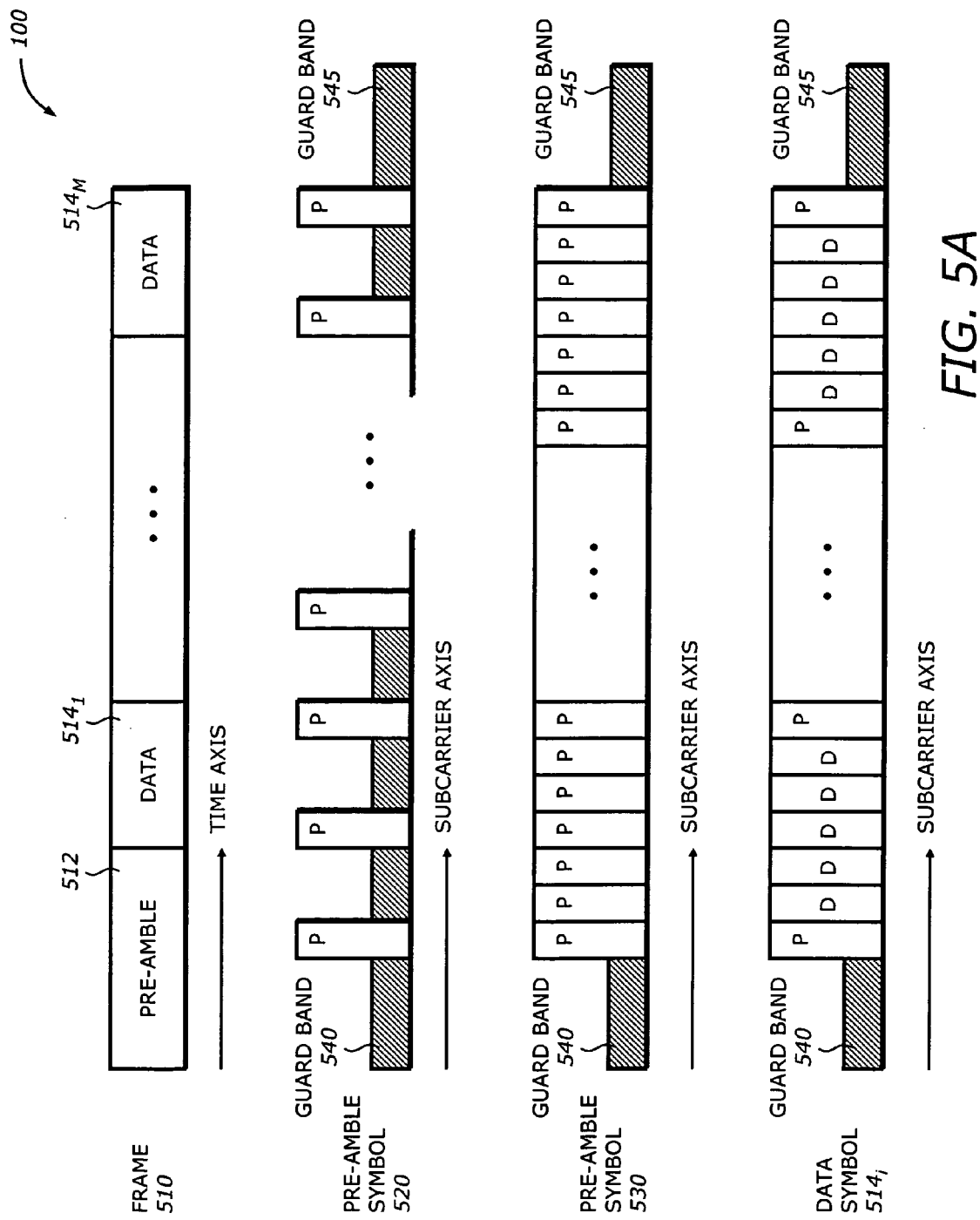
FIG. 5A is a diagram illustrating a frame structure according to one embodiment of the invention.

FIG. 5A is a diagram illustrating a frame structure 510 according to one embodiment of the invention. The frame structure 510 represents a typical frame for an OFDM or OFDMA system. It may include one or two pre-amble symbols 512 and M data symbols $514_1$ to $514_M$ where M is a positive integer.

The pre-amble symbol 512 may include pre-amble symbol 520 or pre-amble symbol 530. The pre-amble symbol 520 consists of equally spaced pilot sub-carriers. The pre-amble symbol 530 consists of all pilot sub-carriers from the sub-carriers being used. the data symbol $514_i$ consists of data sub-carriers, marked "D", and pilot sub-carriers, called data pilot, marked "P".

The channel estimation may be performed using the pilot sub-carriers of the pre-amble symbol 520 or 530 and/or the data symbol $514_i$. Generally, OFDM or OFDMA systems do not use all sub-carriers whose number is the number N of the data points used in the frequency-domain processor. They exclude the guard sub-carriers in guard bands 540 and 545 from the sub-carriers being used.

Figure 5B:
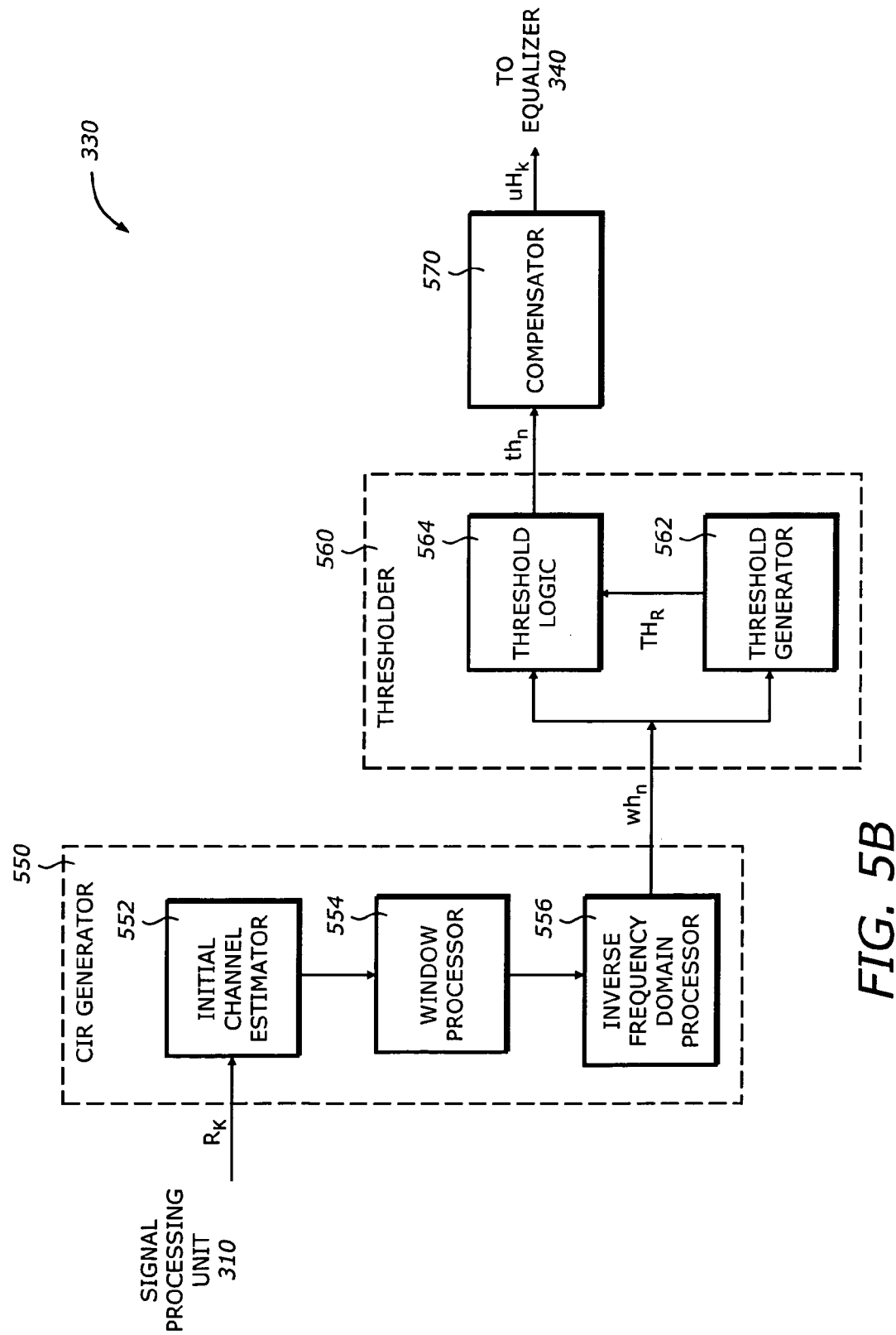
FIG. 5B is a diagram illustrating a channel estimator according to one embodiment of the invention.

FIG. 5B is a diagram illustrating the channel estimator 330 shown in FIG. 3 according to one embodiment of the invention. The channel estimator 330 includes a channel impulse response (CIR) generator 550, a thresholder 560, and a compensator 570.

The CIR generator 550 generates a time-domain windowed CIR from a received signal using a window function. The window function may be any suitable window function. In one embodiment, the window function is the Hanning window. The CIR generator 550 includes an initial channel estimator 552, a window processor 554, and an inverse frequency-domain processor 556.

The initial channel estimator 552 generates an initial channel estimate $iH_k$ in frequency domain from the received signal. The initial channel estimate $iH_k$ may be computed according to the following equation:

$$iH_k = \begin{Bmatrix} \frac{R_k}{P_k}, & \text{if } k \text{ is used sub-carrier} \\ 0, & \text{else} \end{Bmatrix}, k = 1, \ldots, N \quad (2a)$$

$$iH_k = \text{interpolation } (iH_k), \text{ if needed} \quad (2b)$$

where $P_k$ is the original signal transmitted by the transmitter processing unit 220 and is known a priori by the receiver processing unit 210.

In equation (2b), interpolation of $iH_k$ may be needed depending on how the pre-amble symbol in the frame structure 510. If the pre-amble is used as in the frame 510 and equally spaced pilot sub-carriers are used as in the pre-amble symbol 520, then the initial channel estimate may be computed according to equation (2a) for the allocated pilot sub-carriers and then interpolation may be performed using this result to estimate channel for all other used sub-carriers. If the pre-amble is used as in the frame 510 and all pilot sub-carriers are used as in the pre-amble symbol 530, then the initial channel estimate may be computed according to equation (2a) for all allocated pilot sub-carriers and then interpolation may be omitted. If the pre-amble symbol is not used and only data symbol is used, then the channel estimation may be done using only the data pilots and then the interpolation may be performed for all other sub-carriers, or using data pilots and data sub-carriers.

The window processor 554 windows the initial channel estimate using the window function. This operation reduces signal discontinuity around the area between the effective signal band and the guard band to mitigate spectral leakages. In one embodiment, the window function is the Hanning window $wF_k$ determined according to the following equation:

$$wF_k = 1 + \cos(2\pi(k-1)/N), k = 1, \ldots, N \quad (3)$$

The window processor 554 performs widowing by multiplying the initial channel estimate $iH_k$ with the window function $wF_k$ according to the following equation:

$$wH_k = iH_k \times wF_k, k = 1, \ldots, N \quad (4)$$

The inverse frequency-domain processor 560 generates the time-domain windowed CIR $wh_n$. The inverse frequency-domain processor 560 may compute the inverse FFT to the windowed channel estimate $wH_k$ according to the following equation:

$$wh_n = \text{IFFT}\{wH_k\}, k=1, \ldots, N; n=1, \ldots, N \quad (5)$$

where IFFT is the inverse FFT.

The resulting time-domain windowed CIR $wh_n$ may have some noise components. These noise components may be removed by the thresholder 560.

The thresholder 560 thresholds the time-domain windowed CIR $wh_n$ to remove noise components. The thresholder 520 includes a threshold generator 562 and a threshold logic 564.

The threshold generator 562 computes a threshold value THR to be used in the threshold logic 564. The threshold value THR may be a fixed constant or may be computed adaptively according to the channel environment and/or other system dynamics. An adaptive threshold value is preferred because it models accurately the channel environment. The threshold generator 562 may compute the threshold value THR adaptively according to the following equations:

$$THR = P_p \times \frac{1}{(N - N_b - N_e)} \sum_{n=N_b+1}^{N_e} Pwh_n \quad (6a)$$

$$Pwh_n = |wh_n|^2, n = 1, 2, \ldots, N \quad (6b)$$

where N is the FFT size, $P_p$ is a proportionality constant, $N_b$ and $N_e$ are the beginning and ending indices, respectively, of the time-domain windowed CIR $wh_n$ which indicates the start and end points of noise-like band.

Therefore, only the elements of the time-domain windowed CIR $wh_n$ whose index is inside $N_b$ and $N_e$ are used to compute the threshold. $N_b$ and $N_e$ may be determined according to some system consideration. For example, if an OFDM system employs $L_p$ as a length of the guard interval (or cyclic prefix), then $N_b$ and $N_e$ may be set equal to $L_p$. The threshold value THR computed according to equation (6a) takes into account the average noise power. Therefore, it may adapt to the channel system dynamics or environment.

The threshold logic 564 thresholds the time-domain windowed CIR $wh_n$ using the threshold value THR. It compares the power value $Pwh_n$ with the threshold value THR and generates the noise-removed time domain windowed CIR $th_n$ according to the following equation:

$$th_n = \begin{Bmatrix} wh_n, & \text{if } Pwh_n > THR \\ 0, & \text{else} \end{Bmatrix} n = 1, 2, \ldots, N \quad (7)$$

In other words, an element of the time-domain windowed CIR $wh_n$ is considered as noise if its power is less than the threshold value THR and is assigned a zero value.

Figure 8:
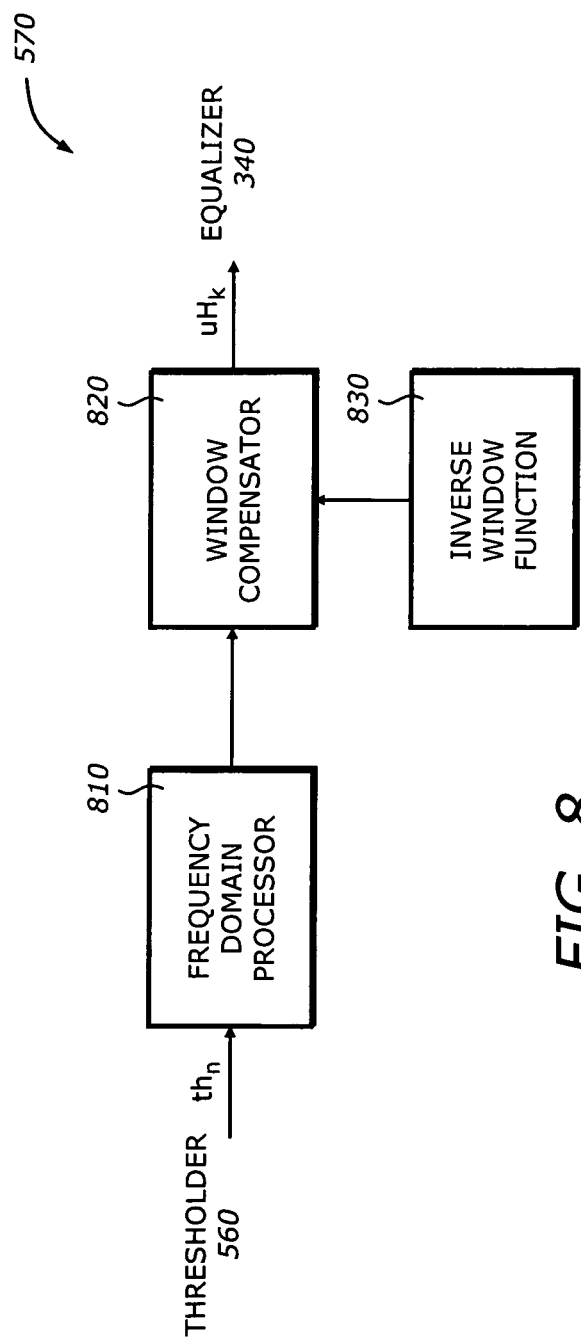
FIG. 8 is a diagram illustrating a compensator using inverse window function according to one embodiment of the invention.

The compensator 530 compensates window effect for the thresholded, or noise-removed, time-domain windowed CIR $th_n$ to provide the enhanced channel estimate $uH_k$ in frequency domain. There may be two techniques to implement the compensator 530. One technique is shown in FIG. 6 and another technique is shown in FIG. 8.

Figure 6:
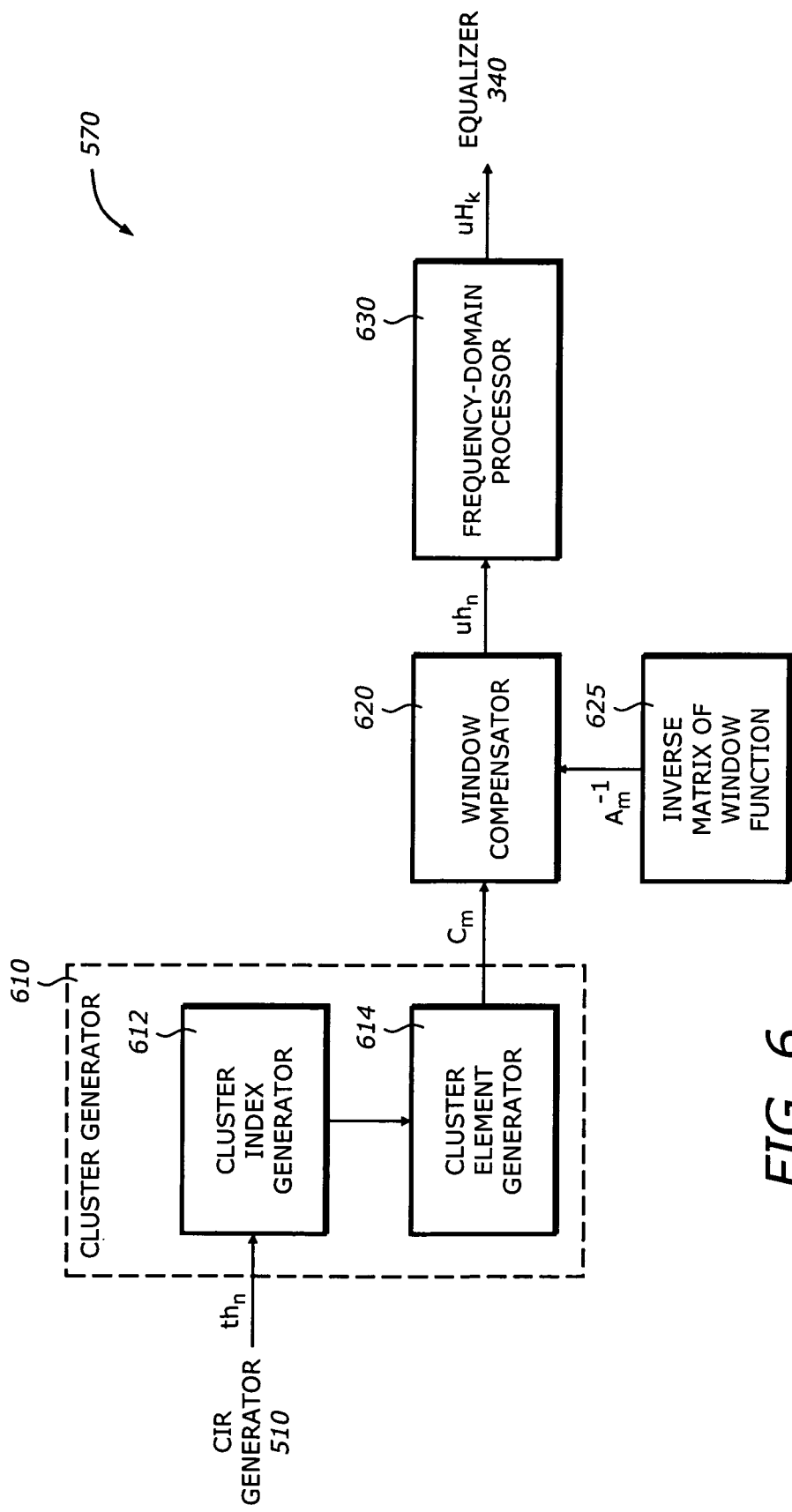
FIG. 6 is a diagram illustrating a compensator using clustering according to one embodiment of the invention.

FIG. 6 is a diagram illustrating the compensator 530 using clustering according to one embodiment of the invention. The compensator 530 includes a cluster generator 610, a window compensator 620, and a frequency-domain processor 630.

The cluster generator 610 generates a compensating vector $C_m$ of components for cluster m in the thresholded time-domain windowed CIR $th_n$. The compensating vector $C_m$ has a length $cL_m$. The cluster generator 610 includes a cluster index generator 612 and a cluster element generator 614. The cluster index generator 612 generates an index vector $xC_m$ indexing a cluster m which is a group of components around an effective component in the thresholded time-domain windowed CIR $th_n$. The cluster element generator 614 extracts the compensating vector $C_m$ in the group of components corresponding to the index vector $xC_m$.

The cluster index generator 612 generates the index vector $xC_m$ using a group of consecutive zero elements in the thresholded, or noise-removed, time-domain windowed CIR $th_n$. A minimum number Nz of consecutive zero elements may be used. The cluster index generator 612 includes a start and end index generators to generate a start index $xsC_m$ and an end index $xeC_m$ of the index vector $xC_m$ for the $m^{th}$ cluster using indices of the consecutive zero elements. The operation of the cluster generator 610 is explained further in FIG. 7.

The window compensator 620 generates a complete window compensated vector $uh_n$ from individual vectors $uc_m$ using $uc_m$ from the compensating vector $C_m$ and a pre-determined inverse matrix $A_m^{-1}$ 625 of the window function. The inverse matrix $A_m^{-1}$ 625 has dimensions corresponding to the length $cL_m$ of the compensating vector $C_m$. In other words, the matrix $A_m$ is a square matrix having a dimension of $cL_m \times cL_m$. The inverse matrix $A_m^{-1}$ 625 has the same dimension.

The compensation for the window effect is performed in the time domain. Since multiplication in the frequency domain corresponds to convolution in the time domain, the desired compensated vector may be obtained by solving a convolution equation for each cluster m. The convolution matrix $A_m$ for each cluster m may be constructed using the impulse response of the window function with dimension $cL_m \times cL_m$. For the Hanning window function, the impulse response may be given in the following equation:

$$wf_n = 0.5\delta_{n-1} + \delta_n + 0.5\delta_{n+1}, n=1, \ldots, N \quad (8)$$

Let the elements of the compensating vector $C_m$ and the window compensated vector $uc_m$ be:

$$C_m = [e_{m,1} \, e_{m,2} \ldots e_{m,cLm-1} \, e_{m,cLm}]^T \quad (9a)$$

$$uc_m = [uc_1 \, uc_2 \ldots uc_{cLm-1} \, uc_{cLm}]^T \quad (9a)$$

where T indicates transpose.

The window compensation may be performed according to the following equations:

$$\begin{bmatrix} uc_1 \\ uc_2 \\ uc_3 \\ \vdots \\ uc_{cL_m-2} \\ uc_{cL_m-1} \\ uc_{cL_m} \end{bmatrix} = \quad (10a)$$

$$\begin{bmatrix} 0.5 & 1.0 & 0.5 & 0.0 & 0.0 & 0.0 & \cdots & 0.0 & 0.0 & 0.0 & 0.0 \\ 0.0 & 0.5 & 1.0 & 0.5 & 0.0 & 0.0 & \cdots & 0.0 & 0.0 & 0.0 & 0.0 \\ 0.0 & 0.0 & 0.5 & 1.0 & 0.5 & 0.0 & \cdots & 0.0 & 0.0 & 0.0 & 0.0 \\ & & & \cdots & & & & & & & \\ 0.0 & 0.0 & 0.0 & 0.0 & 0.0 & \cdots & 0.5 & 1.0 & 0.5 & 0.0 & 0.0 \\ 0.0 & 0.0 & 0.0 & 0.0 & 0.0 & \cdots & 0.0 & 0.5 & 1.0 & 0.5 & 0.0 \\ 0.0 & 0.0 & 0.0 & 0.0 & 0.0 & \cdots & 0.0 & 0.0 & 0.5 & 1.0 & 0.5 \end{bmatrix}^{-1}$$

$$\begin{bmatrix} e_{m,1} \\ e_{m,2} \\ e_{m,3} \\ \vdots \\ e_{m,cL_m-2} \\ e_{m,cL_m-1} \\ e_{m,cL_m} \end{bmatrix}$$

$$\begin{bmatrix} uc_1 \\ uc_2 \\ uc_3 \\ \vdots \\ uc_{cL_m-2} \\ uc_{cL_m-1} \\ uc_{cL_m} \end{bmatrix} = \quad (10b)$$

$$\begin{bmatrix} 1.0 & 0.5 & 0.0 & 0.0 & 0.0 & \cdots & 0.0 & 0.0 & 0.0 \\ 0.5 & 1.0 & 0.5 & 0.0 & 0.0 & \cdots & 0.0 & 0.0 & 0.0 \\ 0.0 & 0.5 & 1.0 & 0.5 & 0.0 & \cdots & 0.0 & 0.0 & 0.0 \\ & & & \cdots & & & & & \\ 0.0 & 0.0 & 0.0 & 0.0 & \cdots & 0.5 & 1.0 & 0.5 & 0.0 \\ 0.0 & 0.0 & 0.0 & 0.0 & \cdots & 0.0 & 0.5 & 1.0 & 0.5 \\ 0.0 & 0.0 & 0.0 & 0.0 & \cdots & 0.0 & 0.0 & 0.5 & 1.0 \end{bmatrix}^{-1} \begin{bmatrix} e_{m,1} \\ e_{m,2} \\ e_{m,3} \\ \vdots \\ e_{m,cL_m-2} \\ e_{m,cL_m-1} \\ e_{m,cL_m} \end{bmatrix}$$

Equation (10a) may be used for Nz=4 and equation (10b) may be used for Nz=2. As shown in the above equations, the elements of the convolution matrix $A_m$ may be known in advance. The inverse matrix $A_m^{-1}$ 625, therefore, may be computed off-line or in advance. Accordingly, the window compensation may be performed efficiently without matrix inversion and include only matrix and vector multiplications.

After the window compensated vector $uc_m$ for all clusters are obtained, the complete window compensated CIR $uh_n$ may be obtained as follows. First the vector $uh_n$ is initialized with zero elements according to the following equation:

$$uh_n = 0, n=1, \ldots, N \quad (11)$$

Then, the elements of the $uh_n$ are filled with the corresponding elements of the $uc_m$ at the associated index locations according to the following equation:

$$uh_{xCm} = uc_m, m=1, \ldots, M \quad (12)$$

where $xC_m$ is the index vector of the $m^{th}$ cluster, M is the total number of clusters.

The frequency-domain processor 630 computes a frequency-domain vector $uH_k$ from the window compensated vector $uh_n$. The frequency-domain vector $uH_k$ corresponds to the enhanced channel estimate. The frequency-domain processor 630 may compute the frequency-domain vector $uH_k$ by computing the FFT of the window compensated vector $uh_n$. The resulting frequency-domain vector $uH_k$ is obtained after removing noise components and compensating the window effects. Accordingly, it is closer to the original channel than the initially estimated channel $iH_k$ and provides performance improvement.

Figure 7:
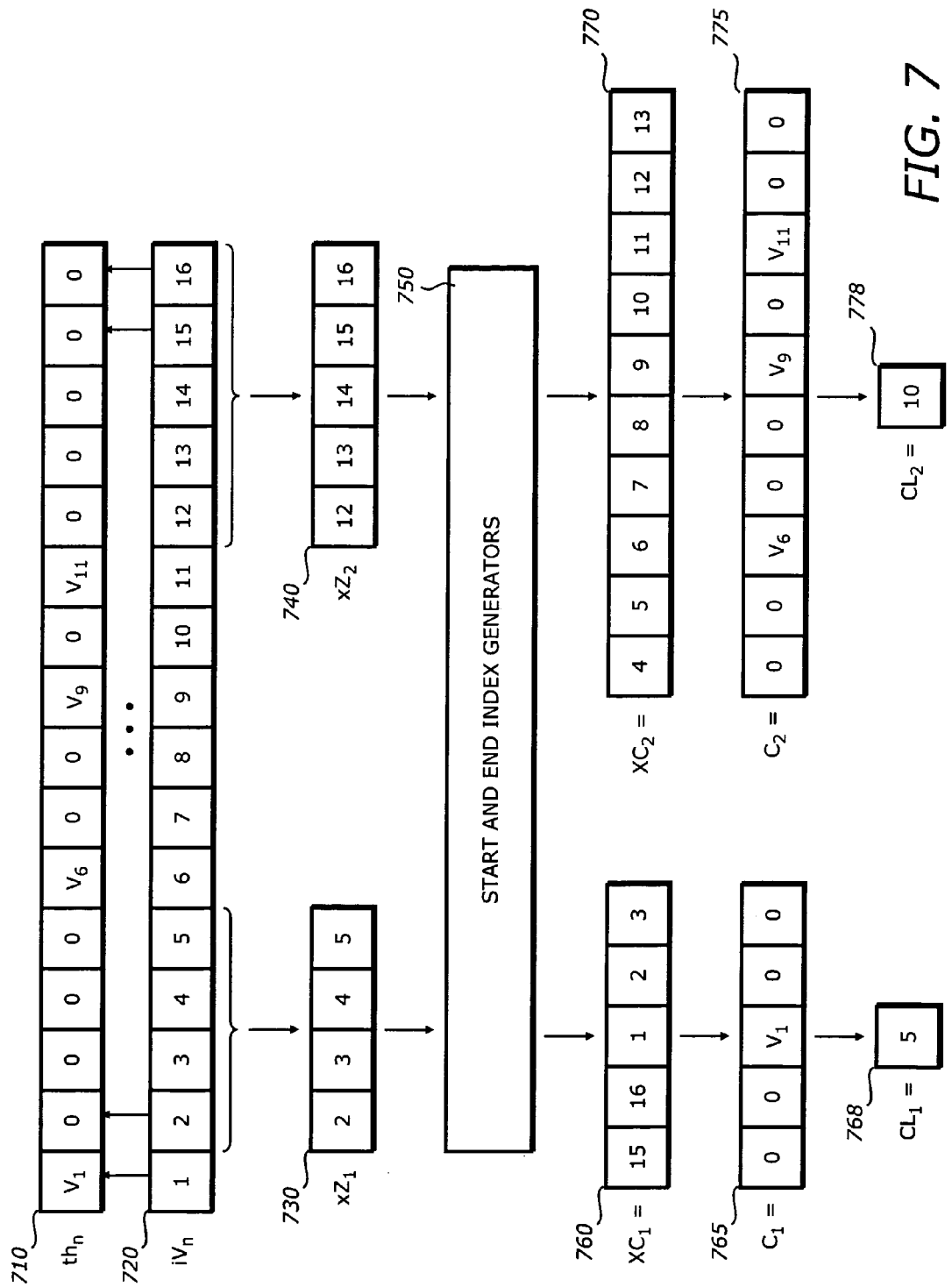
FIG. 7 is a diagram illustrating an example for generating cluster elements according to one embodiment of the invention.

FIG. 7 is a diagram illustrating an example for generating cluster elements according to one embodiment of the invention.

The technique first obtains the thresholded, or noise-removed, time domain windowed CIR $th_n$ with the corresponding index vector $iV_n$. For example, the $th_n$ sequence has N=16 elements in the $th_n$ 710:

$$th_n = [v_1, 0, 0, 0, 0, v_6, 0, 0, v_9, 0, v_{11}, 0, 0, 0, 0, 0]$$

The index vector $iV_n$ 720 is:

$$iV_n = [1, 2, 3, 4, 5, 6, 7, 8, 9, 10, 11, 12, 13, 14, 15, 16]$$

For example, the element at the index 1 is $v_1$, at index 2 is 0, etc.

Then, a minimum Nz zero run length value is determined. This value is selected as the minimum number of consecutive zero values in the $th_n$ sequence. This value may be selected according to some a priori knowledge of the noise pattern in the sequence. In the example shown in FIG. 7, Nz is selected as Nz=4. Clusters in the $th_n$ sequence having the length of consecutive zero values equal to or greater than this minimum value Nz are obtained and their index sequence is designated as $xZ_m$ where m is the cluster number. The $iV_n$ has two clusters that have zero run length equal to or greater than 4. These are $xZ_1$ 730 and $xZ_2$ 740 where:

$$xZ_1=[2,3,4,5] \text{ and } xZ_2=[12,13,14,15,16]$$

The start and end index generators determine the start and end index for the m-th cluster as follows:

$$xsC_m = xZ_{m-1}(\text{end}-Nz/2+1) \quad (13a)$$

$$xeC_m = xZ_m(Nz-Nz/2) \quad (13b)$$

"end" is the total number of indices in the index vector $xZ_{m-1}$. Let k=end−Nz/2+1. The notation $xZ_{m-1}$(end−Nz/2+1)=$xZ_{m-1}$(k) indicates the k-th element of the vector $xZ_{m-1}$. Similarly, let j=Nz−Nz/2. The notation $xZ_m$(Nz−Nz/2)=$xZ_m$(j) indicates the j-th element of the vector $xZ_m$. Cyclic property of the $th_n$ sequence is used when m reaches the end of the cluster number. For example, if m=1, then $xZ_{m-1}=xZ_0$, which is taken as the last cluster in the sequence. In the example shown in FIG. 7, this corresponds to $xZ_2$.

For cluster m=1, $xsC_1$ and $xeC_1$ are determined as:

$$xsC_1 = xZ_2(\text{end}-4/2+1) = [12,13,14,15,16](5-2+1) = 15 \quad (14a)$$

$$xeC_1 = xZ_1(4-4/2) = [2,3,4,5](2) = 3 \quad (14b)$$

For cluster m=2, $xsC_2$ and $xeC_2$ are determined as:

$$xsC_2 = xZ_1(\text{end}-4/2+1) = [2,3,4,5](4-2+1) = 4 \quad (15a)$$

$$xeC_2 = xZ_2(4-4/2) = [12,13,14,15,16](2) = 13 \quad (15b)$$

Then, the final index vector $xC_m$ is obtained using the $xsC_m$ and $xeC_m$ taking into account the end-around property of the index sequence, i.e., when the index reaches the end, the sequence wraps around to the other end. The index vector $xC_m$ is obtained according to the following equation:

$$xC_m = [xsC_m : xeC_m] \quad (16)$$

In the example shown in FIG. 7, $xC_1$ 760 and $xC_2$ 770 are obtained as:

$$xC_1 = [15,16,1,2,3] \quad (17a)$$

$$xC_2 = [4,5,6,7,8,9,10,11,12,13] \quad (17b)$$

From the index vector $xC_m$, the compensating vector $C_m$ for cluster m is obtained by extracting the elements located at the corresponding indices in the index vector xCm. In the example shown in FIG. 7, $C_1$ 765, $cL_1$ 768, $C_2$ 775, and $cL_2$ 778 are obtained as:

$$C_1 = [0,0,v1,0,0] \text{ and } cL_1 = 5 \quad (18a)$$

$$C_2 = [0,0,v6,0,0,v9,0,v11,0,0] \text{ and } cL_2 = 10 \quad (18b)$$

FIG. 8 is a diagram illustrating the compensator 530 using an inverse window function according to one embodiment of the invention. The compensator 530 includes a frequency-domain processor 810 and a window compensator 820.

The frequency-domain processor 810 computes a frequency-domain vector from the thresholded, or noise-removed, time-domain windowed CIR $th_n$. This may be performed by computing the FFT of the sequence $th_n$ according to the following equation:

$$tH_k = FFT\{th_n\}, n, k=1, \ldots, N \quad (19)$$

The window compensator 820 generates a window compensated vector $uH_k$ using an inverse window function 830 of the window function $wF_k$ as given in equation (3) above. The window compensated vector corresponds to the enhanced channel estimate. The window compensated vector $uH_k$ may be computed according to the following equation:

$$uH_k = \frac{tH_k}{wF_k}, k=1, \ldots, N \quad (20)$$

Therefore, an embodiment of the present invention provides an enhanced channel estimate in the receiver of the communication unit 160. The technique is computationally efficient, has a simple architecture, provides performance improvement over existing techniques, and does not require knowledge of SNR and/or channel information.

Elements of embodiments of the invention may be implemented by hardware, firmware, software or any combination thereof. The term hardware generally refers to an element having a physical structure such as electronic, electromagnetic, optical, electro-optical, mechanical, electro-mechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
a channel impulse response (CIR) generator to generate a time-domain windowed CIR from a received signal using a window function;
a thresholder coupled to the CIR generator to threshold the time-domain windowed CIR; and
a compensator coupled to the thresholder to compensate, in the time-domain, for window effect of the thresholded time-domain windowed CIR to provide an enhanced channel estimate,
wherein the compensator comprises:
a cluster generator coupled to the thresholder to generate a compensating vector of components in the thresholded time-domain windowed CIR;
a window compensator to generate a window compensated vector from the compensating vector using a pre-determined inverse matrix of the window function having dimensions corresponding to a length of the compensating vector; and
a frequency-domain processor coupled to the window compensator to compute a frequency-domain vector from the window compensated vector, wherein the frequency-domain vector is the enhanced channel estimate.

2. The apparatus of claim 1 wherein the CIR generator comprises:
an initial channel estimator to generate an initial channel estimate in frequency domain from the received signal;
a window processor coupled to the initial channel estimator to window the initial channel estimate using the window function; and
an inverse frequency-domain processor coupled to the window processor to generate the time-domain windowed CIR.

3. The apparatus of claim 1 wherein the thresholder comprises:
a threshold generator to compute a threshold value; and
a threshold logic coupled to the threshold generator to threshold the time-domain windowed CIR using the threshold value.

4. The apparatus of claim 3 wherein the threshold generator generates the threshold value adaptively according to channel environment.

5. The apparatus of claim 1 wherein the cluster generator comprises:
a cluster index generator to generate an index vector indexing a group of components around an effective component in the thresholded time-domain windowed CIR; and
a cluster element generator to extract the compensating vector in the group of components corresponding to the index vector.

6. The apparatus of claim 5 wherein the cluster index generator generates the index vector using a group of consecutive zero elements in the thresholded time-domain windowed CIR.

7. The apparatus of claim 6 wherein the cluster index generator comprises a start and end index generator to generate a start index and an end index of the index vector using indices of the consecutive zero elements.

8. The apparatus of claim 1 wherein the received signal is compatible with an orthogonal frequency division modulation access (OFDMA) standard.

9. A method comprising:
generating a time-domain windowed CIR from a received signal using a window function;
thresholding the time-domain windowed CIR; and
compensating, in the time-domain, for window effect of the thresholded time-domain windowed CIR to provide an enhanced channel estimate,
wherein the compensating comprises:
generating a compensating vector of components in the thresholded time-domain windowed CIR;
generating a window compensated vector from the compensating vector using a pre-determined inverse matrix of the window function having dimensions corresponding to a length of the compensating vector; and
computing, by a frequency-domain processor, a frequency-domain vector from the window compensated vector, wherein the frequency-domain vector is the enhanced channel estimate.

10. The method of claim 9 wherein generating the time-domain windowed CIR comprises:
generating an initial channel estimate in frequency domain from the received signal;
windowing the initial channel estimate using the window function; and
generating the time-domain windowed CIR using an inverse frequency-domain function.

11. The method of claim 9 wherein thresholding comprises:
computing a threshold value; and
thresholding the time-domain windowed CIR using the threshold value.

12. The method of claim 11 wherein computing the threshold value comprises computing the threshold value adaptively according to channel environment.

13. The method of claim 9 wherein generating the compensating vector comprises:
generating an index vector indexing a group of components around an effective component in the thresholded time-domain windowed CIR; and extracting the compensating vector in the group of components corresponding to the index vector.

14. The method of claim 13 wherein generating an index vector comprises generating the index vector using a group of consecutive zero elements in the thresholded time-domain windowed CIR.

15. The method of claim 14 wherein generating an index vector comprises generating a start index and an end index of the index vector using indices of the consecutive zero elements.

16. The method of claim 9 wherein the received signal is compatible with an orthogonal frequency division modulation access (OFDMA) standard.

17. A system comprising:
a plurality of antennae to receive a radio frequency (RF) signal; and
a receiver processing unit coupled to the antennae, the receiver processing unit comprising:
a receive signal processing unit to process the received RF signal;
a channel estimator to provide an enhanced channel estimate using the processed received RF signal according to an operational mode; and
an equalizer and combiner coupled to the channel estimator to generate an equalized and combined signal using the processed signals and the enhanced channel estimate,
wherein the channel estimator comprises:
a channel impulse response (CIR) generator to generate a time-domain windowed CIR from a received signal using a window function;
a thresholder coupled to the CIR generator to threshold the time-domain windowed CIR; and
a compensator coupled to the thresholder to compensate, in the time-domain, for window effect of the thresholded time-domain windowed CIR to provide an enhanced channel estimate, and
wherein the compensator comprises:
a cluster generator coupled to the thresholder to generate a compensating vector of components in the thresholded time-domain windowed CIR;
a window compensator to generate a window compensated vector from the compensating vector using a pre-determined inverse matrix of the window function having dimensions corresponding to a length of the compensating vector; and
a frequency-domain processor coupled to the window compensator to compute a frequency-domain vector from the window compensated vector, wherein the frequency-domain vector is the enhanced channel estimate.

18. The system of claim 17 wherein the receive signal processing unit comprises:
a RF front end processor to perform RF functions on the signal;
a guard remover coupled to the RF front end processor to remove a guard band from the signal; and
a frequency domain processor coupled to the guard remover to convert the signal to a frequency domain signal having a number of data points, the frequency domain signal corresponding to the processed signal.

19. The system of claim 17 wherein the receiver processing unit further comprising:
a de-mapper coupled to the equalizer and combiner to de-map the equalized and combined signal; and
a decoder coupled to the de-mapper to decode the de-mapped signal.

20. The system of claim 17 wherein the CIR generator comprises:
an initial channel estimator to generate an initial channel estimate in frequency domain from the received signal;
a window processor coupled to the initial channel estimator to window the initial channel estimate using the window function; and
an inverse frequency-domain processor coupled to the window processor to generate the time-domain windowed CIR.

21. The system of claim 17 wherein the thresholder comprises:
a threshold generator to compute a threshold value; and
a threshold logic coupled to the threshold generator to threshold the time-domain windowed CIR using the threshold value.

22. The system of claim 21 wherein the threshold generator generates the threshold value adaptively according to channel environment.

23. The system of claim 17 wherein the received signal is compatible with an orthogonal frequency division modulation access (OFDMA) standard.

24. An apparatus comprising:
means for generating a time-domain windowed CIR from a received signal using a window function;
means for thresholding the time-domain windowed CIR; and
means for compensating, in the time-domain, for window effect of the thresholded time-domain windowed CIR to provide an enhanced channel estimate,
wherein the means for compensating comprises:
means for generating a compensating vector of components in the thresholded time-domain windowed CIR;
means for generating a window compensated vector from the compensating vector using a pre-determined inverse matrix of the window function having dimensions corresponding to a length of the compensating vector; and
means for computing a frequency-domain vector from the window compensated vector, wherein the frequency-domain vector is the enhanced channel estimate.

25. The apparatus of claim 24 wherein the means for generating the time-domain windowed CIR comprises:
means for generating an initial channel estimate in frequency domain from the received signal;
means for windowing the initial channel estimate using the window function; and
means for generating the time-domain windowed CIR using an inverse frequency-domain function.

26. The apparatus of claim 24 wherein the means for thresholding comprises:
means for computing a threshold value; and
means for thresholding the time-domain windowed CIR using the threshold value.

27. The apparatus of claim 24 wherein the means for generating the compensating vector comprises:
means for generating an index vector indexing a group of components around an effective component in the thresholded time-domain windowed CIR; and
means for extracting the compensating vector in the group of components corresponding to the index vector.

28. A machine-readable apparatus comprising a memory unit having one or more software modules stored thereon, the one or more software modules being executable by one or more processors and the one or more software modules comprising:

code for generating a time-domain windowed CIR from a received signal using a window function;
code for thresholding the time-domain windowed CIR; and
code for compensating, in the time-domain, for window effect of the thresholded time-domain windowed CIR to provide an enhanced channel estimate,
wherein the code for compensating comprises:
  code for generating a compensating vector of components in the thresholded time-domain windowed CIR;
  code for generating a window compensated vector from the compensating vector using a pre-determined inverse matrix of the window function having dimensions corresponding to a length of the compensating vector; and
  code for computing a frequency-domain vector from the window compensated vector, wherein the frequency-domain vector is the enhanced channel estimate.

29. The machine-readable apparatus of claim 28 wherein the code for generating the time-domain windowed CIR comprises:
  code for generating an initial channel estimate in frequency domain from the received signal;
  code for windowing the initial channel estimate using the window function; and
  code for generating the time-domain windowed CIR using an inverse frequency-domain function.

30. The machine-readable apparatus of claim 28 wherein the code for thresholding comprises:
  code for computing a threshold value; and
  code for thresholding the time-domain windowed CIR using the threshold value.

31. The machine-readable apparatus of claim 28 wherein the code for generating the compensating vector comprises:
  code for generating an index vector indexing a group of components around an effective component in the thresholded time-domain windowed CIR; and
  code for extracting the compensating vector in the group of components corresponding to the index vector.

* * * * *